Aug. 9, 1966  M. J. COHEN ETAL  3,265,894
MISSILE SCORING SYSTEMS UTILIZING NUCLEAR RADIATION
Filed March 1, 1963  4 Sheets-Sheet 1
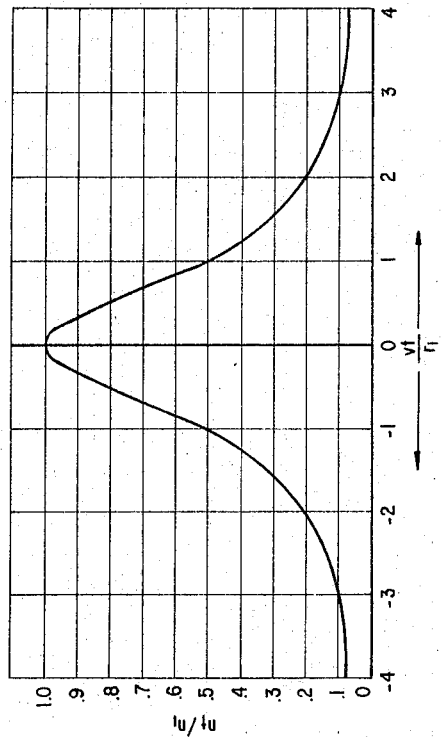
FIG. 1
FIG. 2
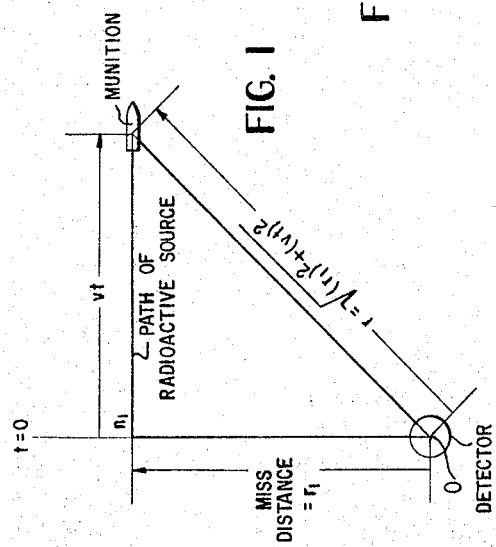
FIG. 5 CALIBRATION SIGNALS 400-2000 cps MODULATION
FIG. 6 15 FT. HIT SIGNAL 1000 cps MODULATION
FIG. 7 30 FT. HIT SIGNAL 400 cps MODULATION
INVENTORS,
MARTIN J. COHEN
DAVID I. CARROLL
HENRY C. GIBSON, JR.
KARL R. GRICE, JR.
ROGER F. WERNLUND
BY Raphael Semmes
ATTORNEY

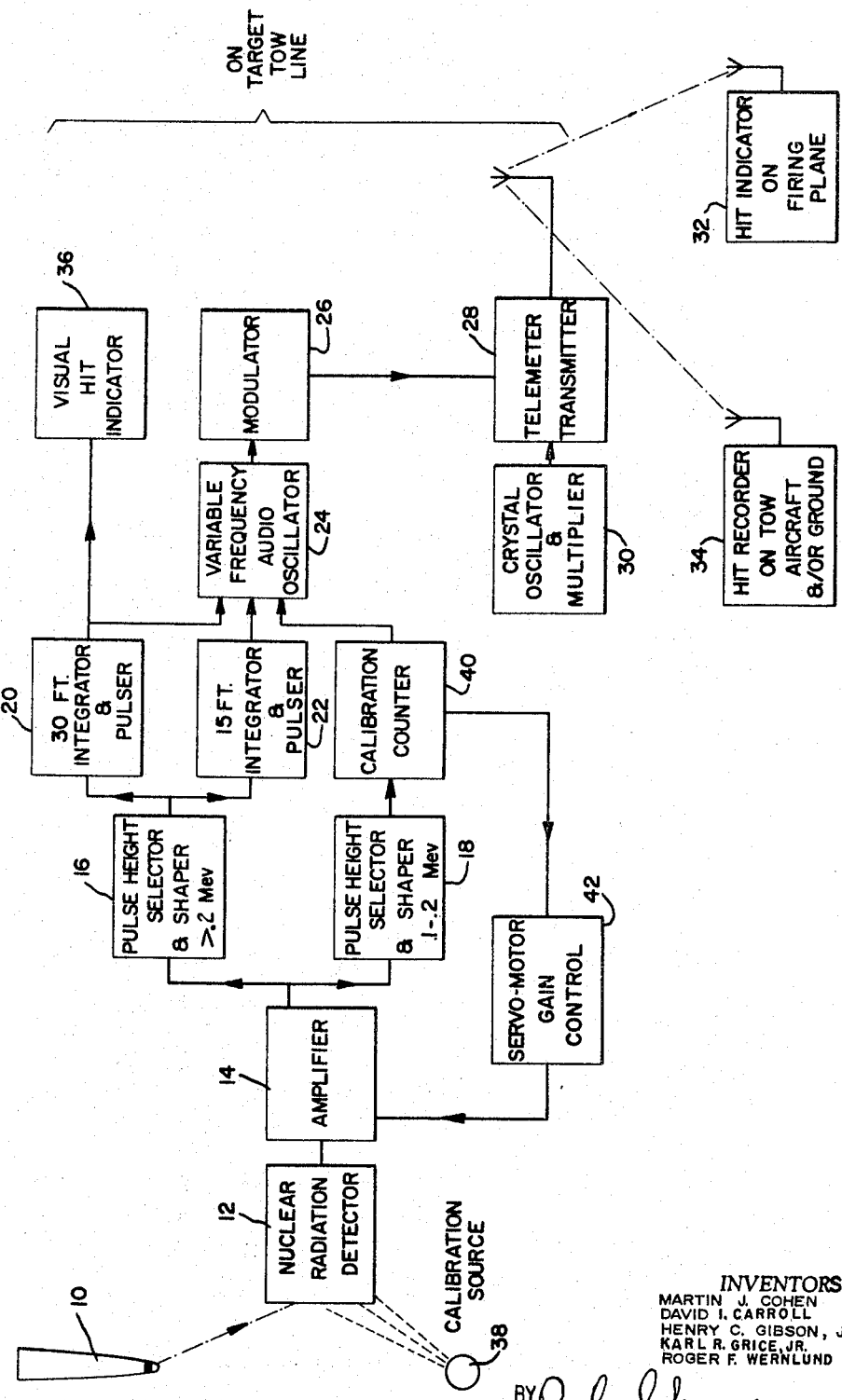

Aug. 9, 1966  M. J. COHEN ETAL  3,265,894
MISSILE SCORING SYSTEMS UTILIZING NUCLEAR RADIATION
Filed March 1, 1963  4 Sheets-Sheet 3

INVENTORS.
MARTIN J. COHEN
DAVID I. CARROLL
HENRY C. GIBSON, JR.
KARL R. GRICE, JR.
ROGER F. WERNLUND
BY
Raphael Semmes
ATTORNEY Aug. 9, 1966     M. J. COHEN ET AL     3,265,894
MISSILE SCORING SYSTEMS UTILIZING NUCLEAR RADIATION
Filed March 1, 1963     4 Sheets-Sheet 4
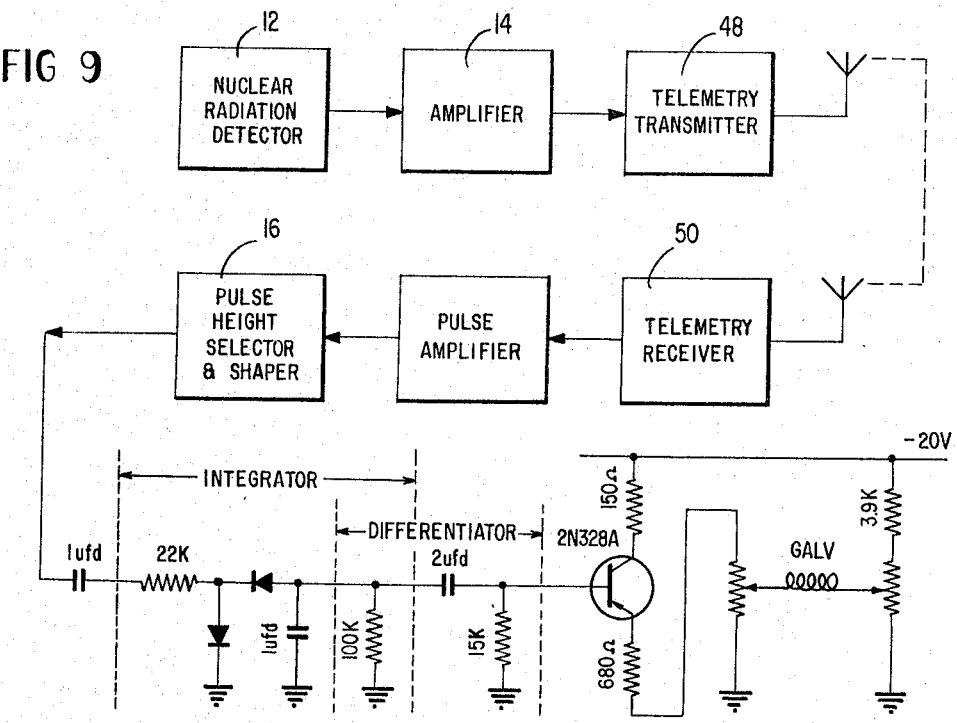
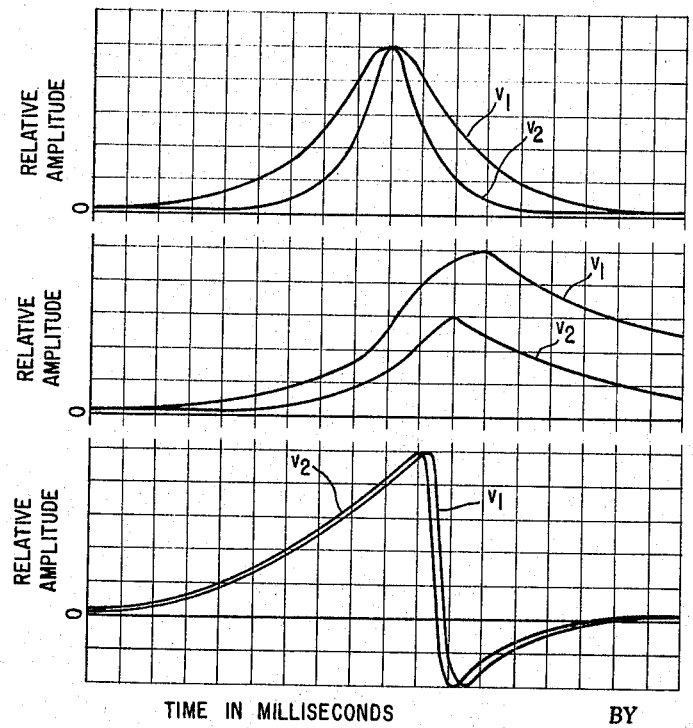
FIG. 10a
FIG. 10b
FIG. 10c
TIME IN MILLISECONDS
INVENTORS
MARTIN J. COHEN
DAVID I. CARROLL
HENRY C. GIBSON, JR.
KARL R. GRICE, JR.
ROGER F. WERNLUND
BY
*Raphael Semmes*
ATTORNEY

United States Patent Office 3,265,894
Patented August 9, 1966

3,265,894
MISSILE SCORING SYSTEMS UTILIZING NUCLEAR RADIATION
Martin J. Cohen, West Palm Beach, David I. Carroll, Lantana, Henry C. Gibson, Jr., Palm Beach, Karl R. Grice, Jr., Lantana, and Roger F. Wernlund, Lake Worth, Fla., assignors to Franklin GNO Corporation, a corporation of Florida
Filed Mar. 1, 1963, Ser. No. 262,142
6 Claims. (Cl. 250—83.3)

This invention relates to systems for scoring munitions, missiles, or projectiles, and more particularly to systems for determining scalar miss-distance or firing error through the use of nuclear radiation.

This application is related to and discloses and claims modifications of and improvements upon the invention disclosed and claimed in copending application, S.N. 781,954, filed December 22, 1958, and which issued on May 28, 1963 as U.S. Patent No. 3,091,463.

Scoring systems which are based upon a visual indication of the hits of munitions directly upon a target are well known. A common system employs an airborne target sleeve that is attached to a towing aircraft by a tow line or drag line. The scoring of munitions fired at the target sleeve may be determined by visual inspection. More elaborate schemes have been devised in which hits are scored by proximity of the munitions to the target. With such systems actual contact of the munitions with the target is not required. This is advantageous in order to simulate a large target with a small high velocity object, either towed or self-powered. Some of the systems employed heretofore use light waves, radio waves, shock waves, or electrostatic charges as the basis of miss-distance determination.

The present invention is based upon the use of nuclear radiation. More specifically, gamma rays are used, because of their long range in air and high energy content. A missile scoring system employing such radiation has definite advantages over systems of other types. Among these advantages are the following:

(1) The radioisotope gamma ray source employed transmits radiation spontaneously and independent of ordinary environmental influences, such as temperature and pressure.

(2) The life of the source can be made as short or as long as desired. The decay of strength can be selected by radioisotope selection and can be calibrated from hours to years.

(3) The radiation is non-jammable by electronic equipment.

(4) The radiation does not interfere with other electronic equipment used in the system tests.

(5) The radiation is non-detectable outside of the design range.

(6) The system operates in an uncrowded region of the electromagnetic spectrum.

(7) The radiation penetrates conducting surfaces and ionized gas layers such as plasmas with negligible attenuation.

In addition, the gamma ray source is very small, is simple to associate with a missile, requires no external or internal power supply, and can be readily varied in magnitude to cover a large range of miss-distance.

At higher altitudes and in outer space, alpha and beta radiation may also be used.

Accordingly it is a principal object of the invention to provide a system of the type described having the foregoing characteristics and advantages.

Another object of the invention is to provide an accurate, lightweight missile scoring system which may readily be made airborne.

A further object of the invention is to provide a system of the foregoing type of which the distance of closest approach of missile and target is measured.

A still further object of the invention is to provide a system of the foregoing type in which the scoring may be made substantially independent of missile-to-target relative velocity over a wide range of velocities.

Yet another object of the invention is to provide a system of the foregoing type in which spurious indications of hits may be substantially reduced.

Still another object of the invention is to provide a system of the foregoing type which is continuously and automatically calibrated, and in which calibration information may be transmitted to a remote monitor.

An additional object of the invention is to provide a system of the foregoing type which produces a hit indication only when the radiation detected exceeds a predetermined threshold value.

A still further object of the invention is to provide a system of the foregoing type including telemetering apparatus which transmits hit information to a remote hit indicator.

Still another object of the invention is to provide a system of the foregoing type in which the target has associated with it an indicator for producing readily visible hit indications.

An additional object of the invention is to provide a system of the foregoing type in which minimal nuclear radiation is required.

The foregoing and other objects, advantages, and features of the invention, and the manner in which the same are accomplished will become more readily apparent upon consideration of the following detailed description of the invention in conjunction with the accompanying drawings, which illustrate preferred and exemplary embodiments of the invention, and wherein:

FIGURE 1 is an explanatory diagram illustrating certain principles of the invention;

FIGURE 2 is an explanatory graph to be considered in conjunction with the diagram of FIGURE 1;

FIGURE 3 is a block diagram of a first form of the invention;

FIGURES 5, 6 and 7 are graphic illustrations of certain signals utilized in the invention;

FIGURE 9 is a schematic diagram of a circuit which may be employed in the invention; and FIGURES 10a, 10b, and 10c are waveform diagrams illustrating certain aspects of the invention.

Introduction

Figure 4A:
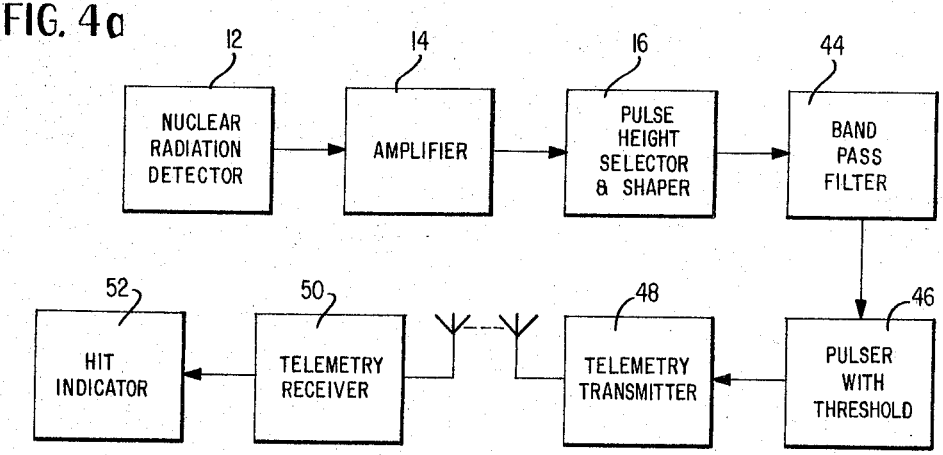
FIGURE 4a is a block diagram of another form of the invention.

Briefly stated, the scoring system of the invention depends upon the "labeling" of missiles of projectiles with a source of nuclear radiation, such as gamma rays. Missile scoring is determined by the proximity or miss-distance of the missile with respect to a target, and in general, the effective volume of the target is much greater than the volume of its actual physical configuration. Target volume is generally a function of the strength of the radiation source and the sensitivity of the radiation detector which may form a part of the target. For a scalar miss-distance indicator, target volume is defined as a sphere centered about the detector, the radius $r_1$ of the sphere being determined by the distance of closest approach of the missile and the target. In one embodiment of the invention hits are registered when the radiation detected by the radiation detector exceeds a predetermined threshold value, it being apparent that the term "hit" as used herein denotes passage of a missile with a predetermined proximity to the target and not necessarily an actual contact of missile and target. In accordance with one feature of the invention, hit information is transmitted to a distant indicator. Such information may also be indicated visually at the target. In accordance with still another feature of the invention the system is calibrated continuously to maintain the predetermined threshold value of sensitivity. The invention may be utilized to produce a go, no-go scalar proximity distance indication or a continuous scalar miss distance indication. Either indication may be made substantially velocity independent.

Theoretical analysis

A theoretical prologue will set the environment for the description of the systems of the invention which follows. Referring to FIGURE 1, it is assumed that a spherical nuclear radiation receiver or detector is located at 0, the target center, and that the diameter of the receiver is $d$. The cross-sectional area, A, of such an omnidirectional receiver is $$A = \frac{\pi d^2}{4}$$

Assume that a munition carrying a source of nuclear radiation having an activity of C millicuries is traveling along a path such as that indicated in FIGURE 1. At any instant of time $t$ the missile is at a distance $r$ feet from the target at 0, where $r$ is a function of $t$. If E is the efficiency of detection of the receiver, then the rate $n$ in photons per second detected by the receiver is given by the relationship:

$$n = \frac{3.7 \times 10^7 AEC}{4\pi r^2} \quad (1)$$

In a system of the invention to be described provision is made for substantially continuous calibration of the radiation receiver, so that E may be considered a constant, independent of temperature, power supply variations, etc. The efficiency E may also be kept constant by designing a component of the target equipment with a compensating or regulating property. Typically a temperature sensitive element such as a thermistor can be used to change the gain of an amplifier in a sense opposite to the changes that occur in the other components such as the scintillator multiplier phototube, etc. The net result is that the receiver has a uniform response with respect to temperature change. A regulated power supply can be used to remove effects of changes in power supply voltage. The factor AE expresses the receiver performance and the term C the transmitter performance. The instantaneous count rate $n$ is independent of relative velocity of missile and target, but as will be explained, in a practical embodiment the count rate is determined by using a finite time interval.

For measurement of scalar miss-distance between a missile and target with a relative velocity of $v$ ft./sec. the following analysis is presented. Let $n_1$ be the peak counting rate value of $n$ received by the detector of cross sectional area A and efficiency E from the radioactive source of activity C millicuries. From the radioactive source $C \times 3.7 \times 10^7$ gamma photons per second are radiated. The relative velocity $v$ of interception is considered as substantially constant in this analysis. Time $t=0$ occurs at distance $r_1$, which is the miss-distance or distance of closest approach of the source and detector.

The counting rate in counts/second at any other time, $t$, is given by:

$$n_t = \frac{r_1^2 n_1}{r_1^2 + v^2 t^2} \quad \text{counts/second} \quad (2)$$

A dimensionless graph of this equation is given by $n_t/n_1$ as a function of $v_t/r_1$ in FIGURE 2. The indefinite integral of Equation 2 is:

$$s = \int^t n_t d_t = \int_{t_1}^{t_2} \frac{2r_1 n_1}{r_1^2 + v^2 t^2} \, dt \quad \text{counts} \quad (3)$$

which is evaluated to be:

$$S = \frac{r_1 n_1}{v} \tan^{-1} \frac{rt}{r_1} \Big|_{t_1}^{t_2} \quad \text{counts} \quad (4)$$

The peak count $n_1$ is given by Equation 1 where $r = r_1$:

$$n_1 = \frac{3.7 \times 10^7 AEC}{4\pi r_1^2} \quad \frac{\text{counts}}{\text{second}} \quad (5)$$

In Equations 3 and 4, $t_1$, $t_2$ are arbitrary limits of the integration time. If $t_1$ and $t_2$ are increased without limit then the value of $\tan^{-1} \infty = \pi/2$ and $$\tan^{-1}(-\infty) = -\pi/2$$

For these values, $$S = \frac{r_1 n_1}{v} \left[ \frac{\pi}{2} - (-\pi/2) \right] = \pi \frac{r_1 n_1}{v} \quad \text{counts} \quad (6)$$

In Equation 6 S is the total number of pulses above the background counts which will contribute to the measurement in a missile pass. From a smoothed count rate pattern as a function of time, a curve similar to that of FIGURE 2, the miss-distance can be obtained when the values AEC are known.

The foregoing discussion has assumed that a signal $n$ in counts per second and a signal S in counts are quantities uniquely determined by Equations 1 and 6. This is strictly true only if the number $n$ is large. However, a determination of the average number of counts in the signal S can and must be made in one munition pass. This is a statistical sampling problem well known to the statistics of measurement of random pulse samples in nuclear physics.

To evaluate the statistical nature of the random nuclear gamma photon signal, the use of a standard statistical equation, namely Poisson's relationship, is required. This special case of the Gaussian distribution is given by the expression:

$$Pq = \frac{S_e^q - S}{q!} \quad (7)$$

Here $Pq$ is the relative probability of observing only $q$ counts in the missile pass above the background count rate, $e$ is the base of the natural logarithm and S is the true average number of counts in the measurement period T.

If repeated missile passes or measurements are taken, a distribution of count measurements $q$ will occur about the true average value S such that the following standard statistical probability table of occurrence applies.

TABLE 1

| Value range: | Probability of Occurrence, percent |
|---|---|
| $S \pm 1\sigma$ | 68 |
| $S \pm 2\sigma$ | 95 |
| $S \pm 3\sigma$ | 99.7 |

$\sigma$ is the standard deviation and is given by:

$$\sigma = \sqrt{S} \quad (8)$$

For a percentage accuracy of P percent where:

$$P = \frac{100\sigma}{S} = 100 \frac{\sqrt{S}}{S} = \frac{100}{\sqrt{S}} \quad (9)$$

a velocity, radioactivity and accuracy relationship for a typical detector can be derived using Equations 5, 6 and 9. Typically:

$$A = \frac{\pi d^2}{4}$$

where $d = 7$ inches $$E = 0.4$$

Then:

$$S=\frac{10^4}{P^2}=\frac{\pi r_1}{v}\times\frac{3.7\times 10^7}{4\pi r_1^2}\times\frac{\pi}{4}\times\frac{7^2}{12^2}\times .4C \quad (10)$$

and by algebraic manipulation:

$$10^2CP^2=vr_1 \quad (11)$$

In actual practice C is the minimum radioactivity that will give P percent measurement accuracy at miss-distance $r_1$ and velocity $v$. Using the strength C millicuries at closer distances $r_1$ and lower velocity $v$ will give a better accuracy P. Typical numerical values for velocity and miss-distance indication are given here to illustrate the quantities involved.

TABLE 2

| Tag Strength, Millicuries (C) | Accuracy, Percent (P) | Distance ($r_1$) | $v$, ft./sec. | Missile-Target |
|---|---|---|---|---|
| 7.5 | 10 | 50 | 1,500 | Rockets-Tow Target. |
| 10 | 10 | 100 | 1,000 | Shells (5 inch)-Tow Target. |
| 30 | 10 | 100 | 3,000 | Shells (20 mm.)-Tow Target. |
| 75 | 10 | 50 | 15,000 | Rockets—ICBM Nose Cones. |
| 3,000 | 10 | 1,000 | 30,000 | Do. |
| 1,500 | 20 | 2,000 | 30,000 | Do. |

*Basic forms of invention*

The two preferred basic forms of the invention are:
(A) The go, no-go scalar proximity distance indicator.
(B) The scalar miss-distance indicator.

*Go, no-go proximity indication*

In the go, no-go proximity scorer hits are registered when the radiation detected by the radiation detector exceeds a pre-determined threshold value. In one embodiment of an air-borne proximity scorer, the system is designed to utilize a signal determined by an interval of time in the vicinity of the peak counting rate, rather than the total count S. While the peak count rate is theoretically velocity independent, the measurement time interval introduces a slight velocity dependence. In a practical case it has been found that with a velocity change from $v$ to $v/2$, where $v$ is 4000 ft./sec. or less, the accuracy can be described by Table 2 where the value of P is increased by not more than a factor of $\sqrt{2}$.

FIGURE 3 illustrates a practical form of go, no-go proximity scorer of the invention. In this figure a missile 10 is shown approaching a nuclear radiation detector 12. The missile may have a wide range of sizes, as for example, from 20 mm. shells to large guided rockets. Each missile is provided with a source of nuclear radiation. The amount and hence the weight of the nuclear material which must be associated with the missile is very small, a source of as little as 200 microcuries of equivalent gamma activity being sufficient to produce a practical threshold signal at short distances. The nuclear material may be attached to the projectile in the form of a label secured to the tip. For large missiles, a ring of active material can be placed about three inches back from the nose. It is a simple matter to provide the necessary nuclear radiation material without altering the aerodynamic or ballistic properties of the missile. It is preferred that the material be provided such that the radiation pattern of the nuclear emission is substantially omnidirectional. Typical schemes will be set forth later.

Figure 8:
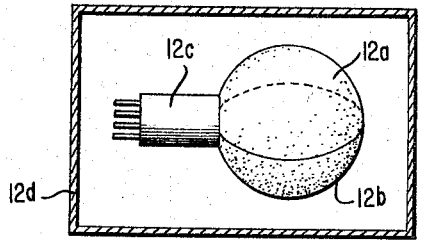
FIGURE 8 is a partly sectional view of an omnidirectional radiation detector which may be employed in the invention.

The nuclear radiation detector 12, together with the associated components shown bracketed, may form part of an airborne target attached to a tow line or mounted on a drone or a parachuted target vehicle. The detector is preferably of the type having an omnidirectional radiation sensitivity pattern and which produces output pulses in response to detected radiation. It may consist of a shell or sphere of special scintillation-activated plastic, such as polyvinyl toluene. The shell may have an outer diameter of about 7″ and an inner diameter of about 5″. A typical unit is illustrated in FIGURE 8, wherein the shell is of spherical configuration, being formed from the hemispherical sections 12a, 12b. Alternately a tetrahedral or other configuration might be used. A photomultiplier tube 12c (such as an RCA type 6199, a Du Mont type 6364, or a Du Mont type 6292) is shown in optical contact with the scintillation material. The sphere of material may have an outer reflecting coating such as a magnesium oxide diffuse reflector or an aluminum mirror reflector. The active portions of the detector are placed in a light-tight housing 12d.

The scintillation detector 12 requires a suitable power supply, as for example, one which produces 2,000 volts at about 1 milliampere. With a continuous calibration system to be described, a non-regulated power supply may be employed. For example the power supply may include a prime battery, a silicon transistor oscillator, a step-up transformer, and a high voltage silicon rectifier. If the oscillator generates a high frequency, of say 100,000 cycles, an RF type transformer with a powdered iron or air core may be employed. Such a power supply weighs very little.

During the passage of the nuclear labeled munition, gamma ray photons strike the detector 12 and are absorbed by the scintillation material. The scintillation material produces a weak flash of light which is converted to electrons and multiplied by the photomultiplier tube to a signal level of say .01 to .1 volt. This pulse, or count, is amplified by an amplifier 14, which may be a 2- or 4-stage proportional pulse silicon transistor amplifier with a band width of 2,000,000 cycles, for example.

The signals from the amplifier are sorted into two amplitude categories by two pulse height selectors and pulse shapers 16 and 18. These units per se are well known. In the form shown, pulse height selector 16 passes pulses greater than .2 mev. while pulse height selector 18 is a differential type and passes pulses in the range of .1 to .2 mev.

The system of FIGURE 3 produces two types of hit indications, one indication for hits within a 30 foot range of the target and another for hits within a 15 foot range. Accordingly, the large pulses from the pulse height selector 16 are channeled to a pair of integrator-pulser units 20 and 22 corresponding to the respective ranges. When the voltage reaches a prescribed threshold level in either network, an output pulse is produced. For example, each of units 20 and 22 may comprise a passive RC integrator of predetermined time constant corresponding to the range (the time constants for units 20 and 22 thus being different) and a pulser which is actuated when the integration voltage reaches a predetermined level. The pulser may include a suitable multivibrator and pulse shaping network.

Each of units 20 and 22 produces an output pulse that is characteristic of the particular unit. For example, each may produce a one second pulse, but the pulse from unit 20 may have an amplitude of five volts, and the pulse from unit 22 may have an amplitude of 10 volts. These pulses may be used to gate on and control the frequency of a variable frequency audio oscillator 24. For example, the normally inactive audio oscillator 24 may produce a one second tone of 400 cycles (see FIGURE 7) when an output pulse is applied from unit 20 and a one second tone of 1,000 cycles (see FIGURE 6) when an output is present from unit 22.

The output of the audio oscillator 24 is applied to a modulator 26 which modulates the carrier of a telemeter transmitter 28. The carrier may be supplied by a crystal oscillator and multiplier 30, which produces an RF carrier in the band of 215 to 235 megacycles per second, for example. The transmitter may produce 2 watts of power and operate at a 0.1% duty cycle. It may have a lightweight transistorized power supply. Signals from the transmitter 28 are radiated and are received by remote units, such as a hit indicator 32 on an aircraft which is firing the missiles to be scored and a hit recorder 34 on the towing aircraft or the ground.

At the target, hits may be indicated visually by an indicator 36. This unit may generate smoke puffs or may comprise an electronic flash of say 500 watt-seconds which will produce a brilliant hit indication. The unit may have a power supply including a battery and a storage capacitor. By virtue of the indicators provided, hits may be registered at the target, on the firing plane, on the towing aircraft, and on the ground at a control station.

Maintenance of the threshold signal level and hence the accuracy of the system may be ensured by continuous calibration. In the preferred calibration scheme illustrated in FIGURE 3, a built-in calibration source 38 is employed. This source may be a radioisotope such as carbon 14, which continually emits radiation below about .15 mev. maximum beta radiation. The radiation detector 12 is continually exposed to the radiation from source 38 and produces output pulses which are amplified by the amplifier 14. The height of these pulses is much less than the height of the pulses corresponding to radiation from the missile 10, and hence the calibration pulses pass through the pulse selector 18, rather than the pulse selector 16. The output of the pulse height selector 18 is supplied to a calibration counter 40 which counts the calibration pulses and produces a D.C. output voltage dependent upon the counting rate. Counter 40 may comprise an RC integrator or a low pass filter with a relatively long time constant of the order one second and an output voltage proportional to the applied pulse count rate. Such properties are well known in linear count rate meters.

The output voltage from counter 40 controls a servo motor gain control 42 for the amplifier 14. It is apparent that the amplifier 14, pulse height selector 18, calibration counter 40, and servo motor gain control 42 form a closed loop servo-mechanism which changes the gain of the amplifier (or other component of the system) in order to keep the calibration frequency constant. Any change in the performance of the scintillator, multiplier phototube, power supplies, etc. which changes the gain of the loop will be balanced by a change of gain in the amplifier. The hardware of block 42 may be any of the following:

(a) Chopper stabilized D.C. amplifier with an input reference voltage set to buck out the potential generated by integrating network 40 set at the proper calibration frequency. If the frequency increases, the input voltage goes above zero and causes a differential relay to close and drive a motor to reduce the gain. The reverse happens on a decrease in frequency.

(b) Electronic servo in which the error voltage reduces the gain of the amplifier or the high voltage supply by changing the bias condition of one or more transistors or vacuum tubes.

Thus the servo package can be partially mechanical or all transistorized electronics to fulfill the function of block 42. Typically, the gain control may include a 6 volt D.C. motor and a gear train which drives a low torque ten turn amplifier gain control potentiometer. The direction of rotation of the motor is determined by the value of the D.C. output voltage from the counter 40. An increased count rate increases the output voltage and drives the motor in one sense to decrease the amplifier gain. A decreased count rate decreases the voltage and drives the motor in the opposite sense to increase the amplifier gain. A narrow dead zone is provided where the motor is not activated. Because the loop drift is small and the correction rapid, the motor may operate only about .01% of the time.

In order that the state of calibration may be monitored the servo loop correction signal also tone modulates the audio oscillator 24 at about a 0.1% duty cycle to produce a tone between 400 and 2,000 cycles per second (see FIGURE 5). When the system is properly calibrated, a 1,000 cycles per second tone will be generated, deviations being indicated by a change in tone. The tone frequency is dependent upon the level of the D.C. output of the counter 40, the 0.1% duty cycle being obtained by using an interrupter or oscillator in block 40 which controls the application of the D.C. output to block 24.

A plutonium or radium D (polonium) alpha particle source can also be used for calibration of the scoring system. Using this technique a mixture of microcurie amounts of radioactive materials and scintillation plastic illuminates the same multiplier tube as the main scintillation plastic. The pulses due to the alpha sources are arranged to be larger than the gamma signal pulses by use of an optical attenuator. A count rate channel and servo system provide the closed loop for calibration. This technique is similar to that using carbon 14, only now the calibration channel is above the signal channel on a mev. scale. See Review of Scientific Instruments, 32, 599 (1961).

The calibration tone signals are of very short duration, while the hit signals are of one second duration, for example. For a 30 foot hit there will be an output from the integrator unit 20, but not unit 22, and for a 15 foot hit, there will be outputs from both units. Since the oscillator can only generate one fundamental frequency at a time, the 15 foot signal, which produces a greater control voltage for the oscillator, will mask the 30 foot signal, but of course the indication of a 15 foot hit is of itself an indication of the passage of the missile within the 30 foot range. Being of very short duration, the calibration signals will be masked by the hit signals when hits are indicated, but the calibration signals will be transmitted when hits are not present.

In one embodiment designed to give good background rejection consistent with lightweight and low power requirements, the time constant of unit 20 is 10 milliseconds, selected to cover the peak of the count rate pattern, to give a substantially velocity independent signal in accordance with Equation 1. Typically using a 7 inch diameter plastic scintillator and a .8 millicurie radiozinc source on a projectile moving at 2,000 ft./sec. the threshold hit distance is 30 feet. The accuracy obtained is ±10%.

In the embodiment of FIG. 3, short time constants are employed in blocks 20 and 22 so that the peak count rate is measured. This rate is substantially velocity independent to a maximum velocity determined by the strength of the gamma radiation tag. See Equation 5. However, the use of a short time constant requires higher levels of gamma radiation than would be required if longer time constants could be employed. From a consideration of the Equation 4 it is apparent that the use of longer time constants makes the measurement velocity dependent.

Assume that the count rate output of amplifier 14 in FIG. 3 is passed through a network of relatively long time constant, such as an RC integrator or a low pass filter, to produce a smooth pattern like the curve of FIG. 2. In other words, utilizing Equation 4, suppose that the signal S is integrated between the limits $t_1 = t_2 = T/2$ where T is the time constant of the integrator. If a low pass filter is used, the cut off frequency is $f = 1/T$. The voltage output from such a filter is given by $$S = \frac{r_1 n_1}{v} \tan^{-1} \frac{vT}{r_1} \qquad (12)$$

This equation is velocity dependent and is a function of the integration time T. Assume now that the value of T is such that for the lowest velocity $v$ and the largest miss-distance $r_1$ $$\frac{vT}{2r_1} \geq 6$$

Then within the integration period T is 90% of the maximum number of pulses. The maximum number of pulses is given by Equation 6. It is apparent that below a certain minimum design velocity the count loss due to the finite bandpass of the filter becomes excessive. If we take the condition where $$\frac{.9\pi r_1 n_1}{v} < S < \pi \frac{r_1 n_1}{v} \quad (13)$$

corresponding to the assumed $$\frac{vT}{2r_1} \geq 6 \quad (14)$$

then $$T \geq \frac{12 r_1}{v} \quad (15)$$

As an example, if the lowest velocity $v$ is 1200 feet per second and miss-distance $r_1$ is 100 feet or less, then $T \geq 1$ sec. During an integration period of one second a missile traveling at 1200 ft. per second or greater at a miss-distance of 100 ft. or less will produce a signal in which at least 90% of the maximum number of possible signal pulses are counted. While it is apparent that other time constants, miss-distances, and velocities can be selected to satisfy operating conditions in which the count loss due to the finite bandpass of the filter is not excessive, it is nevertheless apparent that the signal S is velocity dependent and that this velocity dependence places limitations upon the measurements which it would be well to eliminate. The exact nature of the velocity dependence can be seen by inserting in Equation 6 the value of $n_1$ from the Equation 5 to give $$S_1 = \pi \frac{3.7 \times 10^7 AEC}{4\pi r_1^2} \times \frac{r_1}{v} \quad (16)$$

Then, $$S_1 = \frac{k_1}{r_1 v} \quad (17)$$

where $k_1$ is the product of the constant coefficients in Equation 16.

It has been discovered that the velocity dependence of the signal S can be eliminated by applying the signal to a high pass filter or differentiating network, such as an RC or LC network, which has the transfer property of producing a signal $S_2$ which is proportional to the velocity $v$. That such a circuit can be realized may be shown quantitatively as follows.

Consider a half sinusoidal wave shape so that the peak of the sinusoid coincides with the peak of the curve of FIG. 2 and the zero crossings of the sinusoid occur at $$\frac{vT}{r_1} = 2$$

The period of the missile pass can be considered to be related to a frequency $f$ where $$f = \frac{1}{t} = \frac{v}{2r_1} \quad (18)$$

Thus an active or passive network whose transient output for a constant impressed signal frequency $f$ is given by the transfer function $k_2 f$ will meet the requirements of Equation 18. The signal $S_2$ derived from treating $S_1$ with the transfer function with a response $k_2 f$ is $$S_2 = k_2 f S_1 = k_2 \left(\frac{v}{2r_1}\right)\left(\frac{k_1}{r_1 v}\right) \quad (19)$$

using Equations 17 and 18. The result is $$S_2 = \frac{k_1 k_2}{2 r_1^2} = \frac{k_3}{r_1^2} \quad (20)$$

Thus it is established quantitatively that circuitry exists for eliminating the velocity dependence of the signal derived from using the entire count rate signal generated during a missile pass. The circuitry may be active or passive as long as it meets the bandpass requirements. A cascade of an RC integrator and an RC differentiator, which is the simplest realization of the circuit, has been found to give correct distance responsive to within 10% from 400 to 4,000 ft. per second relative velocity over a miss-distance range of from 5 to 50 feet. These limits are not limits of the application of the above theorem, however, but rather are experimental results applicable to the requirements for this particular equipment.

FIGURE 4a is a block diagram illustrating the manner in which a system such as that illustrated in FIGURE 3 may be made substantially velocity independent, utilizing substantially the entire count signal produced in a missile pass. Blocks 12, 14, and 16 are the same as those illustrated in FIGURE 3. The output from block 16 passes through the bandpass filter 44 which may comprise a long time constant integrator (or low pass filter) (e.g., T=200 msec.) and a differentiator (or high pass filter) in cascade, adjusted as indicated above to pass a band of frequencies with substantially flat velocity response. The output of the bandpass filter is applied to a pulser 46 having an input threshold, which may simply be the bias which must be overcome to produce a pulse, as from a one-shot multivibrator. The output of the pulser is applied to the telemetry transmitter 48, which may be a complete transmitter system, including oscillator, modulator, amplifier, etc. Any of the conventional forms of information transmission may be utilized to transmit a hit signal to a remote telemetry receiver 50, the output of which is applied to a hit indicator 52. For simplicity, the refinements of FIGURE 3, such as the calibration control and various hit indicators and recorders, have been omitted from FIGURE 4a, but it will be appreciated that such refinements may be incorporated when desired. The provision of a threshold in block 46 insures that a hit indication is produced only when the amplitude of the signal from the bandpass filter 44 exceeds a predetermined level representative of a predetermined miss distance. Another pulser unit with a different threshold could also be supplied from the bandpass filter to provide a hit indication for a different range, as in FIGURE 3. By virtue of the bandpass filter, the peak amplitude of the signal applied to the pulser will be the same for a given miss distance regardless of the velocity of the missile within the design limits, and yet the missile may use a low intensity radioactive source, because substantially the entire count signal is employed in the measurement.

*Scalar miss-distance indicator*

Figure 4B:
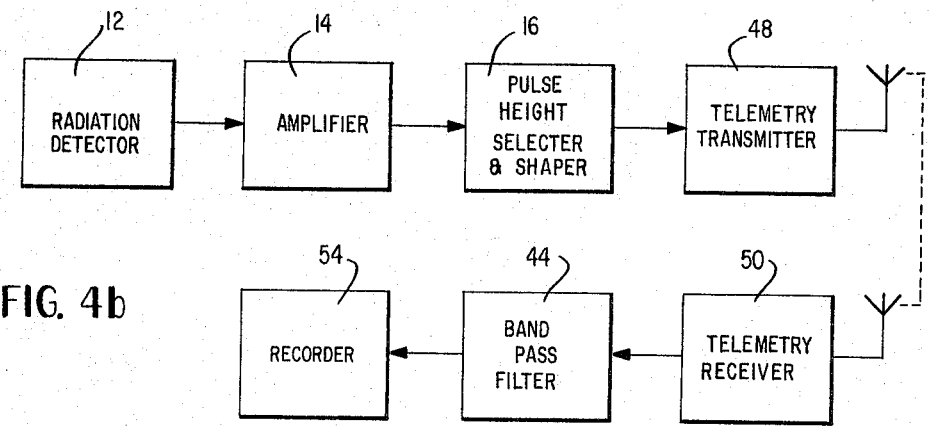
FIGURE 4b is a block diagram of another form of the invention.

The system of FIGURE 4a is a go, no-go system. If a continuous scalar miss distance indication is desired, a system such as illustrated in FIGURE 4b may be employed. In this system the output of block 16 is applied to modulate the transmitter 48 in a conventional manner. The demodulated output of the receiver 50 is applied to the bandpass filter 44. The filter is shown with the receiver, rather than the transmitter, as in FIGURE 4a, and the different location is intended to indicate a variation which may be employed in either embodiment. In FIGURE 4b the output of the bandpass filter is applied to a recorder 54, which may be any conventional type, such as a pen and ink graphical recorder. The recorder gives a continuous display of the signal representing the distance between the missile and the target, the peak of the signal representing the miss distance.

FIGURE 9 illustrates a representative circuit which may be employed in a scalar miss-distance indicator and also shows in block diagram a modification in which block 16 is associated with the receiver, rather than the transmitter. The components and values shown are merely typical. The recorder galvanometer is energized from the output of a bridge circuit including a transistor as shown. The circuit is arranged so as to energize the galvanometer in response to signals from the differentiator of predetermined polarity. The diodes shown in the integrator circuit permit the integrator capacitor to be charged by the input pulses of proper polarity and provide a high impedance to the discharge current from the capacitor.

FIGURE 10 illustrates representative waveforms showing the manner in which a cascade of a long time constant integrator and a differentiator eliminates velocity-dependence. FIGURE 10a shows ideal curves similar to FIGURE 2, representing the smoothed count signal (and hence distance from the target) as a function of time for two missile passes at different velocities $v_1$, and $v_2$, where $v_1$ is less than $v_2$ and the miss-distance is the same. FIGURE 10b shows curves representing the output of the integrator for the two passes. The time constant of the integrator is long enough so that substantially the entire count signal is utilized, but the peaks of the curves differ because of the difference in velocity. FIGURE 10c shows curves representing the output of the differentiator. The height of the peaks is now the same, the positive peak value being utilized as a measure of miss-distance.

The cascade of integrator (or low pass filter) and differentiator (or high pass filter), constituting a bandpass filter, is adjusted for optimum response in accordance with the operating requirements. Typically, the filter might accommodate a velocity ratio of 10:1. The low and high cut-off frequencies for the filter may be respectively determined by the relationships $$f_L = \frac{v_L}{12 r_{1\,max}} \quad \text{(see Equation 15)}$$

and $$f_H = \frac{v_H}{2 r_{1\,min}} \quad \text{(see Equation 18)}$$

For a lowest velocity $v_L = 600$ feet/sec. and maximum range $r_{1\,max} = 50$ feet, $f_L = 1$ cps. For highest velocity $v = 3000$ feet/sec. and minimum range $r_{1\,min}$ of 5 feet, $f_H = 30$ cps. Thus a bandpass filter having these cut-off frequencies and a pass band of substantially flat velocity response will provide the desired results. The type of bandpass circuit referred to above is merely representative.

*The nuclear radiation source*

For the radioisotope label it is desirable to use a material having a moderately short half-life activity in order to eliminate radioactive accumulation. However, a very short half-life leads to practical problems of maintaining constant transmitter activity. As set forth previously, another requirement for the radioisotope is that the peak of gamma ray energy emitted should be appreciably higher than say 1 mev. The following table is a list of certain radioisotopes, their half-life, and the energy of the gamma rays emitted.

| Element | Half-life | Principal Gamma Rays |
| --- | --- | --- |
| Sodium 24 | 15 hours | 2.7 Mev. |
| Iodine 131 | 8 days | 0.34 Mev., 0.64 Mev. |
| Barium 140—Lanthanum 140 | 12.8 days | 2.3 Mev., 2.6 Mev., 2.9 Mev. |
| Antimony 124 | 60 days | 1.7 Mev., 2.1 Mev. |
| Scandium 46 | 85 days | .90 Mev., 1.12 Mev. |
| Zinc 65 | 250 days | 1.12 Mev. |
| Ruthenium 106—Rhodium 106 | 1 year | 1.55 Mev., 2.41 Mev. |
| Cobalt 60 | 5.3 years | 1.17 Mev., 1.33 Mev. |

In view of the criteria expressed previously, it is apparent that antimony 124 and zinc 65 are suitable radioisotopes.

Several methods of attaching the radioisotope label to the munition may be employed. The required radioactive material may be combined in a continuous foil or thin plastic as an insoluble material. Ceramic, clay, and glass type chemical compounds have recently found wide usage in insoluble binding of radioactive materials. Such a compound can be put into strip form, say $\frac{1}{16}''$ wide and .005 inch thick and supplied in a storage magazine. The magazine can be placed in a simple hand tool which will dispense a segment of this strip to the munition along with a high tack thermosetting adhesive. Rubber based and epoxy based adhesives with very high instant tack strength which increases with time and heat may be employed.

The device which attaches the radioisotope material to the shell can also select the proper amount of activity by determining the area of foil to be attached. With zinc 65 (half-life 250 days) a foil diameter of $\frac{1}{16}$ of an inch can be used initially. This area can be progressively increased if the originally supplied strip of foil is not used up in say 40 days. Every 40 days 10% more area is added to the foil to keep the shell activity the same. This can be done automatically by suitable time control.

Other ways of associating the radioactive source with the munitions are as follows:

(1) By mixing the radioactive material as an ingredient of the shell material during manufacture of the munitions.
(2) By nuclear pile activation of the shell material.
(3) By application of an adherent plating or paint.
(4) By inserting an active core in the munition.

From the foregoing description of the invention it is apparent that unique missile scoring systems are provided. While preferred embodiments of the invention have been shown and described, it will be apparent to those skilled in the art that changes can be made without departing from the principles and spirit of the invention, the scope of which is defined in the appended claims. For example, while systems have been described in which the radiation source is associated with a missile and the detector is associated with a target, the arrangement may be reversed so that the missile carries the detector and the target carries the source. Furthermore, in a go, no-go proximity scorer, the output of the radiation detector may be transmitted to the ground by conventional techniques, and a determination of a hit or miss may be made on the ground by equipment of the type utilized in the airborne scorer. Scoring data may also be transmitted from the ground station to airborne receivers. Moreover, it is apparent that the invention is not useful solely for testing munitions or weapons, but may be employed with respect to space vehicles, aircraft, ground or sea craft, or objects generally, to determine proximity. Accordingly, the foregoing embodiments are to be considered illustrative, rather than restrictive of the invention, and those modifications which come within the meaning and range of equivalency of the claims are to be included therein:

The invention claimed is:

1. Apparatus for determining the spacial relationship of one object moving with respect to another, comprising a source of nuclear radiation positioned on one of said objects, a detector of said nuclear radiation positioned on the other of said objects for producing a detector signal as a function of the level of the radiation detected from said source, means including a bandpass filter connected to the output of said detector and utilizing substantially the entire detector signal during movement of said one object relative to the other for producing an output signal representing the distance between said objects substantially independent of the relative velocity of said objects, and indicating means responsive to said output signal.

2. The apparatus of claim 1, wherein said indicating means comprises means for recording said output signal as a function of time.

3. A system comprising a pair of relatively movable objects, one of said objects having a source of nuclear radiation, and the other of said objects having a detector of a type which produces a count rate signal as a function of the level of said radiation detected, and means including a bandpass filter connected to the output of said detector and utilizing substantially the entire count rate signal during relative movement of said objects for producing an output signal representing the distance between said objects substantially independent of the relative velocity of said objects.

4. In a system for determining miss-distance during a pass of nuclear radiation-emitting objects relative to a target having a detector of a type producing a count rate signal as a function of the level of said radiation detected, means including a bandpass filter and utilizing substantially the entire count rate signal during a pass of an object for producing an output signal representing the distance between that object and said target substantially independent of their relative velocity, and indicating means responsive to said output signal.

5. In the system of claim 4, a threshold circuit connected between said filter and said indicating means.

6. The system of claim 4, said filter having cut-off frequencies in accordance with substantially the following relationships:

$$f_L = \frac{v_L}{12 r_{1\,max}}$$

and $$f_H = \frac{v_H}{2 r_{1\,min}}$$

where $f_L$ is the low cut-off frequency, $v_L$ is the velocity of the slowest object relative to said target, $r_{1\,max}$ is the maximum miss-distance between an object and said target, $f_H$ is the high cut-off frequency, $v_H$ is the velocity of the fastest object relative to said target, and $r_{1\,min}$ is the minimum miss-distance between an object and said target.

References Cited by the Examiner

UNITED STATES PATENTS

| | | | |
|---|---|---|---|
| 2,436,563 | 2/1948 | Frosch | 250—83.6 |
| 2,987,621 | 6/1961 | Mielziner et al. | 250—71.5 |
| 3,106,640 | 10/1963 | Oldendorf | 250—83.3 |
| 3,154,685 | 10/1964 | Foster | 250—83.6 |

RALPH G. NILSON, *Primary Examiner.*

ARCHIE R. BORCHELT, *Examiner.*